UNITED STATES PATENT OFFICE.

EDWARD P. HUDSON, OF NEW YORK, N. Y.

IMPROVEMENT IN PROCESSES FOR TREATING MOLTEN METALS.

Specification forming part of Letters Patent No. 176,787, dated May 2, 1876; application filed August 26, 1875.

*To all whom it may concern:*

Be it known that I, EDWARD P. HUDSON, of New York, in the county and State of New York, have invented an Improved Process of Treating Molten Metals; and I do hereby declare that the following is a full and exact description thereof.

My improved process, as herein described, is designed for refining, purifying, and carbonizing low-grade cast-irons, and restoring worn-out cast-irons, making them equal or superior to irons smelted with charcoal from the same or similar ores. The principles of the process are applicable also to the refining of other metals where corresponding purposes are to be effected.

The basis of this process lies, first, in the introduction of refining and purifying agents into the molten metal at the bottom, or below the surface of the liquid mass, these materials being previously pulverized and then compacted into a close coherent form, by which they can be retained beneath the surface of the metal while operating upon it, and introduced continually in a manner to graduate and strictly to proportion their quantity, according to the requirements of the case; second, in the introduction of carbonaceous materials in a similar form and similar manner into the molten metal in graduated quantities and definite proportions for carbonizing the metal, or keeping up the desired degree of carbonization thereof, while the refining process, due to the other agents, is going on.

For conducting this process I employ an apparatus for introducing refining and carbonizing materials below the surface of the molten metal, substantially as described in Letters Patent No. 165,929 granted to me July 27, 1875, and my process is herein described as employing such an apparatus; but any other practicable apparatus, which could accomplish the same purpose, might be used in the process. The fluxes and reagents used for refining and purifying the cast-iron, such as caustic lime, carbonate of lime, fluoride of calcium, carbonate of soda, nitrate of soda, alumina, and the oxides of iron and manganese are first pulverized, and then made into a mass of the requisite density and form for introducing into the chamber containing the metal, by moistening them, compressing, and afterward drying the mass. The interstices are then filled with the dry powdered material, so that the molten metal will not permeate it and get beneath the mass or block thereof.

For the carbonaceous material in a fine state, I use powdered charcoal, saw-dust, powdered bituminous coal or coke, flour, (say, such as has been damaged,) or equivalent materials, or any mixture of two or more of such materials as may be desirable, and I compact them in a close mass. Generally I unite the refining and carbonaceous materials in one mass, so that the molten iron may be carbonized, or its percentage of carbonization be retained, while the process of refining and eliminating sulphur, phosphorus, silica, and other substances injurious to the iron therefrom, with the other materials, is going on. In using my aforesaid apparatus the materials are compacted into the movable introducing cylinders, as described in the said Letters Patent, and are introduced thereby through the bottom of the furnace or pot which contains the molten iron, and consequently below the surface of the metal. The piston or plunger, by which the masses or blocks of refining materials are forced up into the molten metal, may be raised very gradually and regularly, only as fast as the materials are worked off from the upper end of the masses or blocks and taken up by the molten iron. Thus I can employ the refining and carbonizing materials in just such quantities as may be required, and with little or no waste of non-utilized material. I can likewise stop the process at any moment with no unused surplus material left therein and lost, what is not used being withdrawn below.

I am enabled by this process to carry the refining operation as well as the carbonization to any extent desired, so as to make any grade of iron, semi-steel, and steel, and these of superior quality, excelling in purity, strength, elasticity, ductility, homogeneousness, and resiliency in an eminent degree; and I produce these valuable results from very low grades of iron, and from worn-out irons; and I carry the process to any desired point, stopping just where any special qualities are required.

When some of the fluxes are introduced into the molten iron, if not guarded against, they attack the alumina and silica of the lining of the furnace pot or chamber and rapidly destroy it. To obviate this, I use for the exterior of the flux core or block a thin coating of powdered alumina, or of any other powdered material which has no considerable affinity for the substances composing the lining, and the use of which will be beneficial as a refining agent in the iron, or at least not injurious thereto.

This process may be conducted in many cases without applied heat, in a receptacle into which the molten metal has been drawn.

What I claim as my invention, and desire to secure by Letters Patent, is—

1. The process herein described of treating molten metals, consisting in the introduction in graduated quantity below the surface of the metal of solid refining materials finely divided, but compacted into masses, substantially as herein specified.

2. The process herein described of treating molten metals, consisting in the introduction in graduated quantity below the surface of the metal of solid carbonaceous materials, finely divided but compacted into masses, substantially as herein specified.

3. The process herein described of treating molten metals, consisting in the introduction in graduated quantity, below the surface of the metal, of a mixture of refining and carbonaceous materials solid and finely divided, but compacted into masses, substantially as herein specified.

4. The process herein described of treating molten metals, consisting in the introduction in graduated quantity, below the surface of the metal, of solid and finely-divided refining materials compacted into masses, which are coated with a substance that has little or no affinity for the lining of the furnace or containing-vessel, substantially as herein specified.

Specification signed by me this 25th day of August, 1875.

EDWARD P. HUDSON.

Witnesses:
J. S. BROWN,
GEO. L. HUGGINS.